(12) United States Patent
Yanagisawa et al.

(10) Patent No.: US 9,246,720 B2
(45) Date of Patent: *Jan. 26, 2016

(54) SEMICONDUCTOR DEVICE AND RECEIVER

(71) Applicant: Renesas Electronics Corporation, Kawasaki-shi, Kanagawa (JP)

(72) Inventors: Kiyoshi Yanagisawa, Kanagawa (JP); Osamu Inagawa, Kanagawa (JP); Toshiya Aramaki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,780

(22) Filed: Dec. 11, 2014

(65) Prior Publication Data

US 2015/0103931 A1    Apr. 16, 2015

Related U.S. Application Data

(63) Continuation of application No. 13/938,859, filed on Jul. 10, 2013, now Pat. No. 8,938,039.

(30) Foreign Application Priority Data

Jul. 13, 2012    (JP) .................................. 2012-157275

(51) Int. Cl.
    *H04L 25/08*    (2006.01)
    *H04B 1/10*    (2006.01)
    *H04B 3/54*    (2006.01)
    *H04L 7/00*    (2006.01)

(52) U.S. Cl.
    CPC *H04L 25/08* (2013.01); *H04B 1/10* (2013.01); *H04B 3/542* (2013.01); *H04L 7/0054* (2013.01); *H04L 7/0079* (2013.01)

(58) Field of Classification Search
    CPC ...... H04B 1/1036; H04B 1/10; H04B 1/1027; H04B 2203/5425; H04B 2203/5491; H04B 3/145; H04B 3/54; H04B 3/542; H04B 7/086; H04B 10/60; H04B 7/0857; H04B 1/713; H04B 1/7156; H04B 3/04; H04B 3/46; H04B 7/2693; H04L 25/08; H04L 7/0054; H04L 2007/047; H04L 2025/03522
    See application file for complete search history.

(56) References Cited

U.S. PATENT DOCUMENTS 6,219,376 B1    4/2001    Zhodzishsky et al.
7,302,240 B2    11/2007   Koga et al.
7,493,133 B2    2/2009    Krishnan et al.
(Continued)

FOREIGN PATENT DOCUMENTS

JP    2005-57644 A    3/2005
JP    2005-514628 A   5/2005
(Continued)

*Primary Examiner* — Hirdepal Singh
(74) *Attorney, Agent, or Firm* — Foley & Lardner LLP

(57) ABSTRACT

A semiconductor device contains a narrow band noise detector section to detect narrow band noise in an input signal that is input by way of a power line. The semiconductor device further includes a reference signal generator section to generate a second reference signal whose amplitude value which corresponds to the narrow band noise frequency of a pre-established first reference signal is reduced, and a correlation calculation section to calculate the correlation value between the input signal and the second reference signal utilized in the frame synchronization processing of the input signal.

9 Claims, 10 Drawing Sheets

(56) References Cited

U.S. PATENT DOCUMENTS

| | | |
|---|---|---|
| 7,551,965 B2 | 6/2009 | Bange et al. |
| 8,155,176 B2 | 4/2012 | Propp et al. |
| 2002/0196876 A1 | 12/2002 | Takada |
| 2008/0304577 A1* | 12/2008 | Koga et al. .................... 375/257 |
| 2009/0304133 A1 | 12/2009 | Umari et al. |
| 2010/0014685 A1 | 1/2010 | Wurm |
| 2010/0067563 A1 | 3/2010 | Wang et al. |
| 2010/0158171 A1* | 6/2010 | Safavi .......................... 375/346 |
| 2010/0220821 A1 | 9/2010 | Vrcelj et al. |
| 2011/0065409 A1* | 3/2011 | Kenington ................... 455/307 |
| 2012/0128048 A1 | 5/2012 | Dabiri |
| 2012/0302190 A1* | 11/2012 | McHenry ............. H04B 17/382 455/226.3 |
| 2013/0115904 A1 | 5/2013 | Kapoor et al. |
| 2014/0105262 A1* | 4/2014 | Alloin ...................... H04B 3/46 375/222 |
| 2014/0269867 A1* | 9/2014 | Meller et al. .................. 375/224 |

FOREIGN PATENT DOCUMENTS

| | | |
|---|---|---|
| JP | 2009-225470 A | 10/2009 |
| WO | WO 03/058271 A1 | 7/2003 |

* cited by examiner

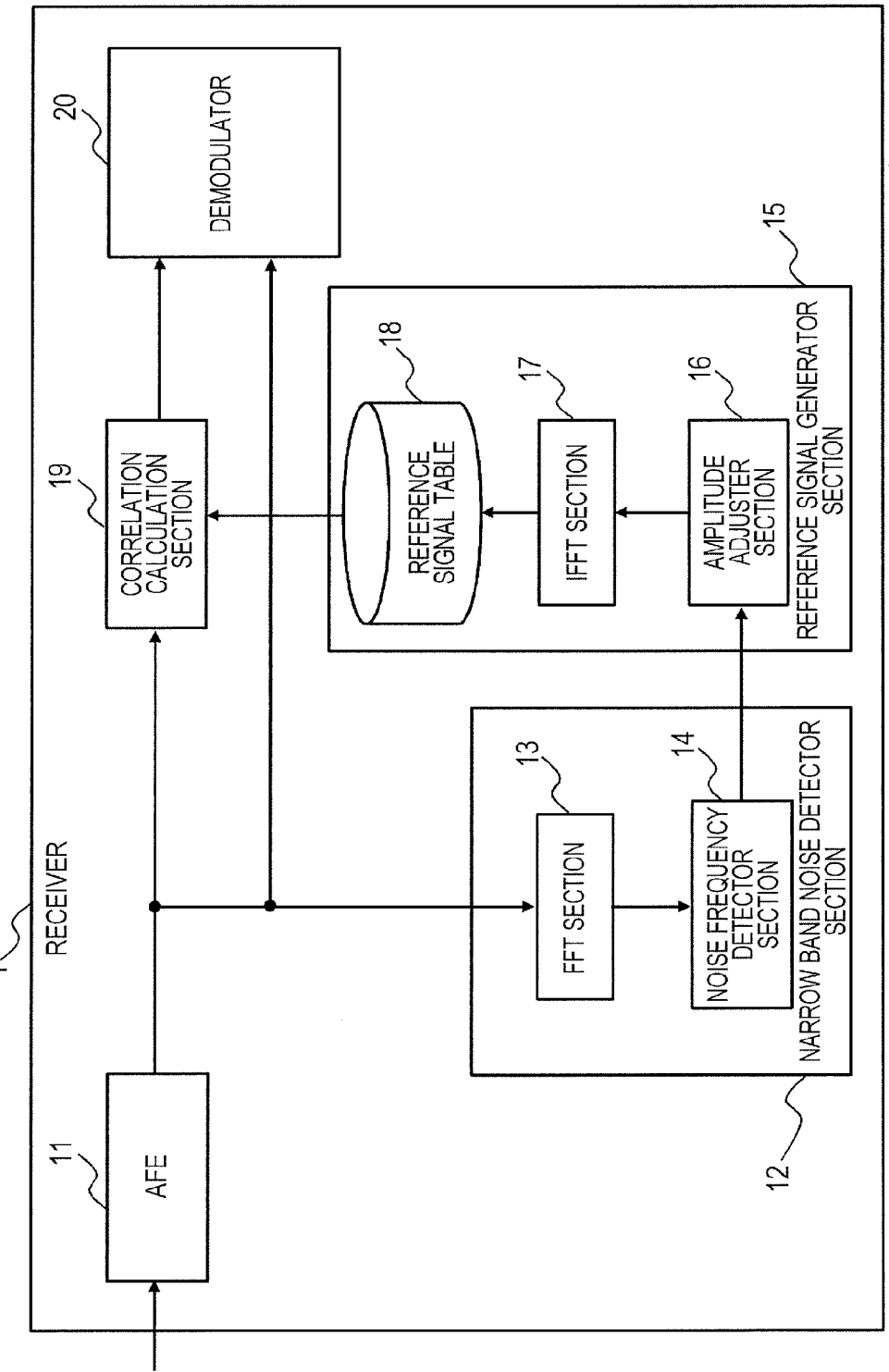

PREAMBLE freq

NARROW BAND
NOISE freq

GENERATED
PREAMBLE freq

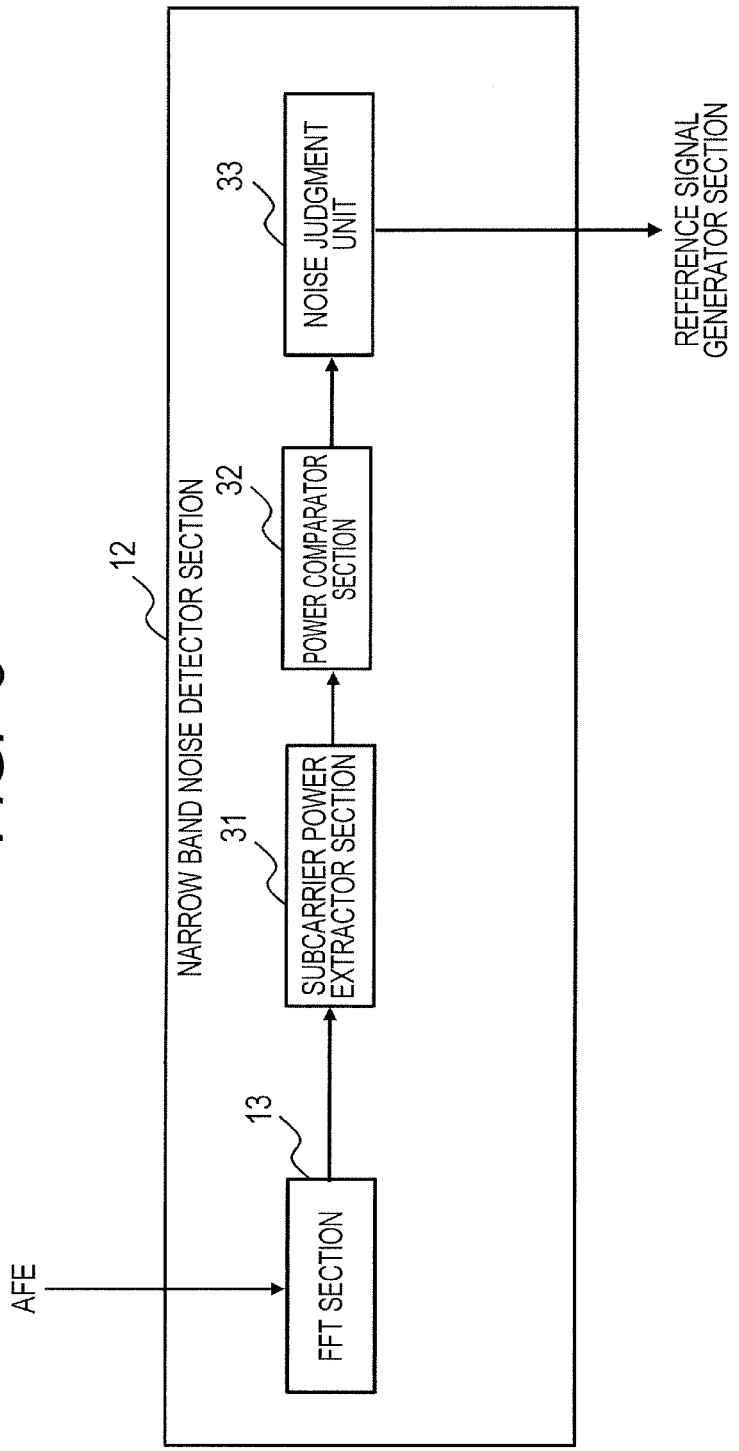

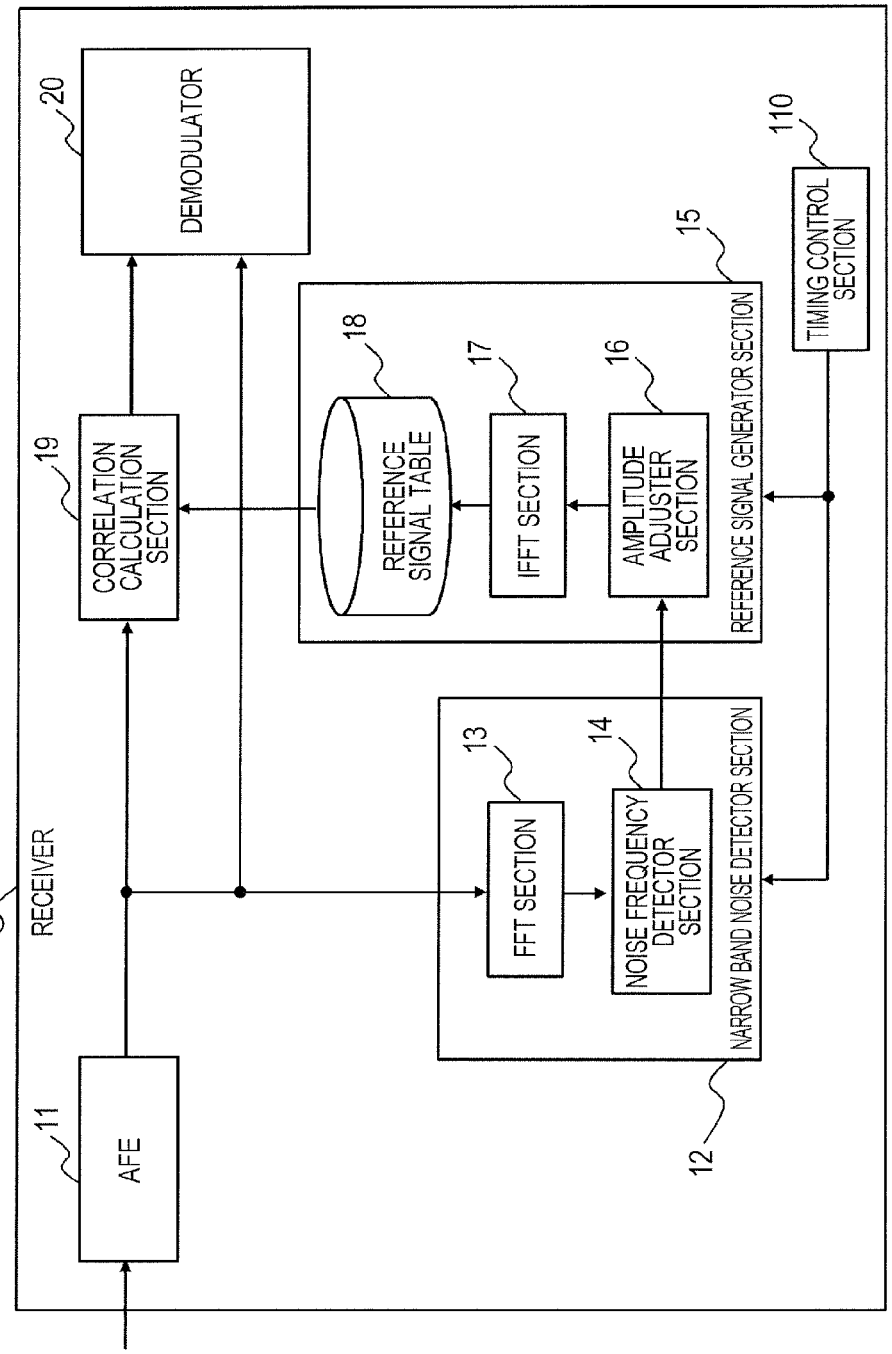

SEMICONDUCTOR DEVICE AND RECEIVER

CROSS-REFERENCE TO RELATED APPLICATIONS

This application is a continuation of U.S. application Ser. No. 13/938,859, filed Jul. 10, 2013, which claims benefit of priority from the prior Japanese Application No. 2012-157275, filed Jul. 13, 2012; the entire contents of all of which are incorporated herein by reference.

BACKGROUND

The present invention relates to a semiconductor device, ideal for utilization for example in semiconductor devices for performing correlated calculations.

In recent years advances are being made in studies relating to power line communications in which communication is carried out by way of power lines. Unlike wireless communication (radio) utilizing communication channels whose output level is limited strictly by legal or standards, in power line communications there is a large amount of noise generated from the various equipment coupled to the power line. Noise generated in power line communication is narrow band noise generated from switching regulators, etc. This narrow band noise causes a frame synchronization error. The receiver that receives the signal must therefore suppress the effects from this narrow band noise.

US Patent Application Publication No. 2009-0304133 discloses a structure that eliminates noise in the input signal by adaptively changing the filter coefficient and changing the filter characteristics so as to reduce noise to a minimum. The receiver disclosed in US Patent Application Publication No. 2009-0304133 also carries out synch detection by using the noise-removed input signal.

Japanese Unexamined Patent Application Publication No. 2009-225470 discloses a power line communication device that does not utilize the subcarrier that generates narrow band noise in the input signal.

SUMMARY

The receiver disclosed in US Patent Application Publication No. 2009-0304133 eliminates narrow band noise frequency components by utilizing notch filtering according to the narrow band noise in the input signal. However this method has the problem that this method removes not only the narrow band noise but also the adjacent frequency signal components to the narrow band noise. The similar problem also occurs in the power line communication device disclosed in Japanese Unexamined Patent Application Publication No. 2009-225470 due to operation that does not use the subcarrier components of the narrow band noise in the input signal. Other issues and novel features will be made clear and apparent from the description of the present specifications and accompanying drawings.

The semiconductor device of the present embodiment is a device that detects narrow band noise in the input signal from the power line, and calculates the correlation between the input signal and the reference signal whose amplitude value corresponding to the narrow band noise of the frequency is reduced.

A semiconductor device and receiver according to the embodiment of the present invention can be provided in which the effects of narrow band noise are eliminated.

BRIEF DESCRIPTION OF THE DRAWINGS

FIG. 1 is a block diagram of the receiver of a first embodiment;

FIG. 3 is a block diagram of the narrow band noise detector section of the first embodiment;

FIG. 10 is a block diagram of the structure of the receiver of a fourth embodiment.

DETAILED DESCRIPTION

First Embodiment

Figure 2A:
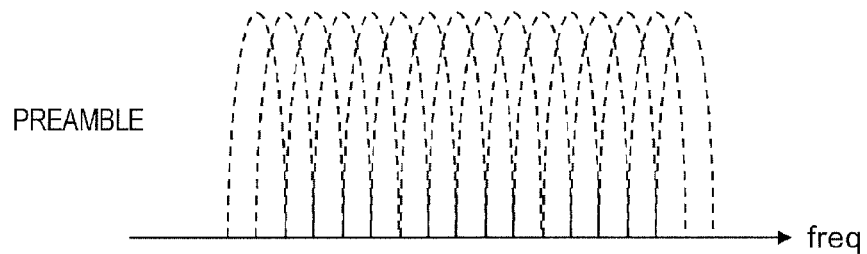
FIG. 2A is a drawing for describing the preamble signal in the frequency domain of the first embodiment.

The embodiment is described next while referring to the accompanying drawings. A structural example of a receiver 1 of a first embodiment is first of all described while referring to FIG. 1. The receiver 1 includes an AFE 11, a narrow band noise detector section 12, a reference signal generator section 15, a correlation calculation section 19, and a demodulator 20. The narrow band noise detector section 12 includes an FFT section 13 and a noise frequency detector section 14. The reference signal generator section 15 contains an amplitude adjuster section 16, an IFFT section 17, and a reference signal table 18.

The AFE (Analog Front End) 11 receives an analog signal sent from an external device and so on that is different from the receiver 1. The AFE 11 adjusts the gain of the received analog signal. The AFE 11 also converts the analog signal to a digital signal. The AFE 11 outputs the analog-to-digital converted signal to the narrow band noise detector section 12, a correlation calculation section 19, and a demodulator 20.

The FFT section 13 performs Fourier transform of the time domain digital signal output from the AFE 11 to a frequency domain digital signal. The digital signal for the frequency domain is a signal linked to the power or the receive power shown by utilizing the frequency and digital signals. The time domain digital signal is a signal linking the sampling time and amplitude of the signal. The FFT section 13 outputs the frequency domain digital signal to the noise frequency detector section 14.

The noise frequency detector section 14 determines whether the frequency domain digital signal that is output contains narrow band noise. The noise frequency detector section 14 also detects the frequency where the narrow band noise is occurring when the signal is determined to include narrow band noise. The detection processing of the narrow band noise is described in detail later on. Narrow band noise is noise having a narrow frequency band relative to the band used for communications and that is generated from equipment coupled to the power line. Moreover, the narrow band noise is noise output from a radio wave emitting device near the periphery of the communication device utilized for wireless communication. The noise frequency detector section 14 outputs the information relating to the narrow band noise frequency to the amplitude adjuster section 16.

The amplitude adjuster section 16 sets the signal component corresponding to the narrow band noise frequency of a pre-established reference signal to 0. Alternatively, the amplitude adjuster section 16 sets the signal component corresponding to the narrow band noise frequency of the pre-established reference signal to a sufficiently small value. An overview of the process for adjusting the reference signal in the amplitude adjuster section 16 is described here using FIG. 2.

Figure 2B:
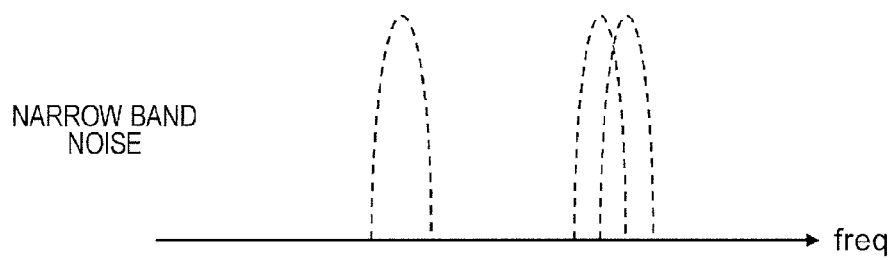
FIG. 2B is a drawing for describing the narrow band noise in the first embodiment.
Figure 2C:
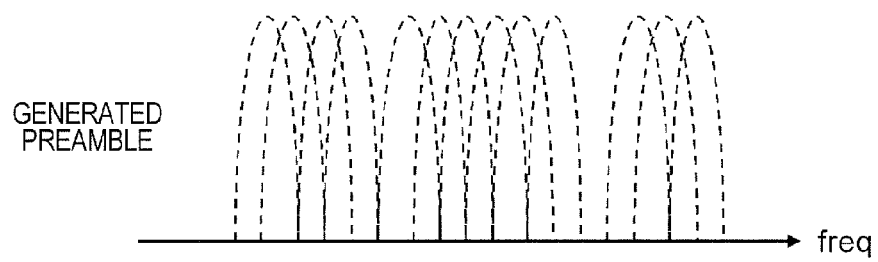
FIG. 2C is a drawing for describing the preamble signal whose amplitude is adjusted in the first embodiment.

FIG. 2A is a drawing showing a preamble signal as one example of the reference signal for a pre-established frequency domain. The horizontal axis in FIG. 2A shows the frequency. In FIG. 2B and FIG. 2C, the horizontal axis also shows the frequency. FIG. 2B shows the detected narrow band noise. Information relating to the frequency where the narrow band noise shown in FIG. 2B is occurring is output from the noise frequency detector section 14 to the amplitude adjuster section 16. The amplitude adjuster section 16 sets the signal component of the frequency shown in FIG. 2B where narrow band noise is occurring, to 0 for the preamble signal shown in FIG. 2A. FIG. 2C shows the preamble signal for the case where the signal component of the frequency where narrow band noise is occurring is set to 0 for a preamble signal in a pre-established frequency domain.

Returning now to FIG. 1, the amplitude adjuster section 16 outputs the reference signal of the frequency domain shown in FIG. 2C to the IFFT section 17.

The IFFT section 17 converts the reference signal for the frequency domain output from the amplitude adjuster section 16 to a reference signal for a time domain. The IFFT section 17 outputs the time domain reference signal to the reference signal table 18.

The reference signal table 18 records information related to the time domain reference signal output from the IFFT section 17. When the IFFT section 17 periodically outputs information relating to the time domain reference signal, the reference signal table 18 may record just the latest information or may record information relating to plural time domain reference signals.

The correlation calculation section 19 calculates the correlation between the digital signal output from the AFE 11 and the reference signal generated based on information recorded in the reference signal table 18. An example of the correlation calculation is shown next.

In this calculation, the digital signal output from the AFE 11 is set as f(t), and the reference signal generated based on information stored in the reference signal table 18 is set as g(t). In this case, the correlation between the input signal and the reference signal at time t is found by calculating the convolution of f(t), and g(t). The convolution of f(t), and g(t) calculated as $(f*g)(t)=\int f(\tau)g(t-\tau)d\tau$.

When the Fourier transform is set as F, this formula for multiplying in the frequency domain by the convolution principle is expressed as $F(f*g)=F(f) \cdot F(g)$. Here, the digital signal output from the AFE 11 is set as the narrow band noise $f(t)=\sin(\omega t)$. In this case, if the reference signal g(t) contains no frequency component of ω, in other words, when the signal component of frequency ω is 0, the correlation becomes to 0.

The narrow band noise detector section 12 performs Fourier transform of the digital signal output from the AFE 11 in the FFT section 13 and specifies a narrow band noise frequency ω(omega/angular precession velocity), from the frequency domain signal. Moreover, the reference signal generator section 15 sets the frequency component equivalent to ω in the pre-established frequency domain reference signal to 0. The correlation between the reference signal and the narrow band noise calculated by the correlation calculation section 19 can in this way be suppressed to a small value. Reducing the correlation between the narrow band noise and the reference signal to a small value also serves to minimize the effects of narrow band noise and therefore improves the immunity to narrow band noise in synchronization of the frame utilizing the correlating value.

The demodulator 20 performs synchronization processing of the frame output from the AFE 11 by using the correlation value calculation results that are output from the correlation calculation section 19. The demodulator 20 generates a demodulating signal by using the data signal contained in the frame output from the AFE 11 after performing the synchronization processing.

A structural example of the narrow band noise detector section 12 of the first embodiment is described next in detail while referring to FIG. 3. The narrow band noise detector section 12 contains an FFT section 13, a subcarrier power extractor section 31, a power comparator section 32, and a noise judgment unit 33. The subcarrier power extractor section 31, a power comparator section 32, and a noise judgment unit 33 correspond to the noise frequency detector section 14 in FIG. 1.

The FFT section 13 converts the time domain digital signal output from the AFE 11 to a frequency domain digital signal. The FFT section 13 outputs the frequency domain digital signal to the subcarrier power extractor section 31.

The subcarrier power extractor section 31 extracts the receive power value for each subcarrier utilizing the frequency domain digital signal output from the FFT section 13. The subcarrier is a carrier wave for conveying the data. The subcarrier power extractor section 31 detects the receive power value set in each subcarrier. The subcarrier power extractor section 31 outputs information relating to the receive power value that is detected to the power comparator section 32. The subcarrier power extractor section 31 outputs information in sequence, for example from information relating to the receive power value of a subcarrier at a low frequency, to information relating to the receive power value of a subcarrier at a high frequency.

The power comparator section 32 compares the size of receive power in adjacent subcarriers by using information relating to the receive power value of each subcarrier output from the subcarrier power extractor section 31. Adjacent subcarriers are subcarriers on adjacent frequency bands. The power comparator section 32 for example compares the receive power in a subcarrier that is first received (No. 1), with the receive power in a subcarrier that is the second one received (No. 2). The No. 1 and No. 2 subcarriers are subcarriers on adjacent frequencies. The power comparator section 32 therefore compares the receive power value in the adjacent subcarriers. The power comparator section 32 outputs the comparison results to the noise judgment unit 33. The power comparator section 32 further compares the second (No. 2) and third (No. 3) receive power values and outputs the comparison results to the noise judgment unit 33. The power comparator section 32 in this way outputs comparison results for received power values of adjacent subcarriers to the noise judgment unit 33.

The noise judgment unit 33 decides based on comparison results output from the power comparator section 32 whether or not narrow band noise is occurring. The noise judgment unit 33 may for example judge that narrow band noise is occurring in the case where the receive power values is higher than a specified percentage compared to the adjacent subcarrier. In other words, the noise judgment unit 33 may decide that narrow band noise is occurring in the second subcarrier in the case that the receive power value of the second subcarrier is higher than the receive power value of the first subcarrier by a specified percentage or more.

The noise judgment unit 33 outputs to the reference signal generator section 15, information relating to the subcarrier where the narrow band noise is occurring. More specifically, the noise judgment unit 33 outputs information relating to the frequency of the subcarrier where narrow band noise is occurring, to the reference signal generator section 15.

Figure 4:
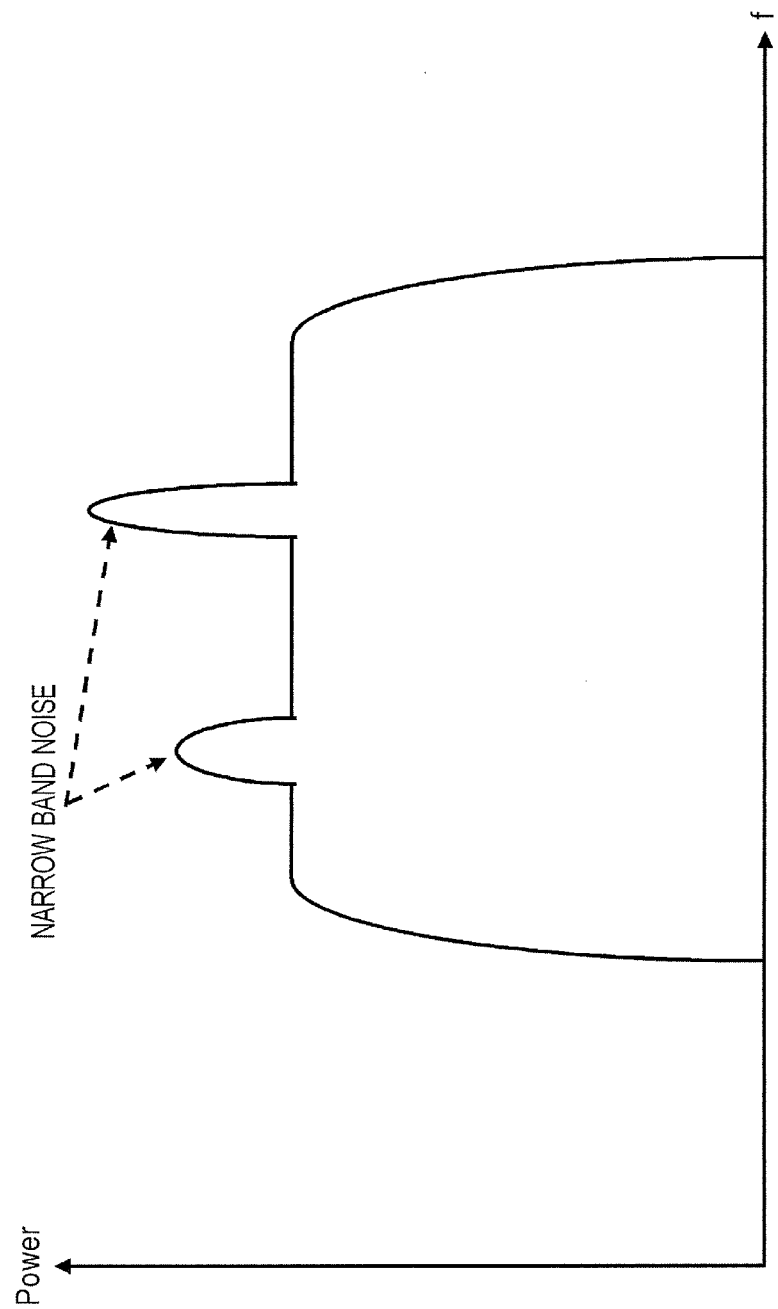
FIG. 4 is a drawing for describing the narrow band noise of the first embodiment.

The detection of narrow band noise by the narrow band noise detector section 12 is described here while referring to FIG. 4. Here, FIG. 4 shows the receive power values for each frequency, and the narrow band noise at two points where the receive power is larger compared to adjacent subcarriers. The narrow band noise occurring at the two points is a receive power larger by a specified percentage than the receive power value of the adjacent subcarriers. The specified percentage by which narrow band noise is judged to have occurred may be decided according to the network environment, etc.

Figure 5:
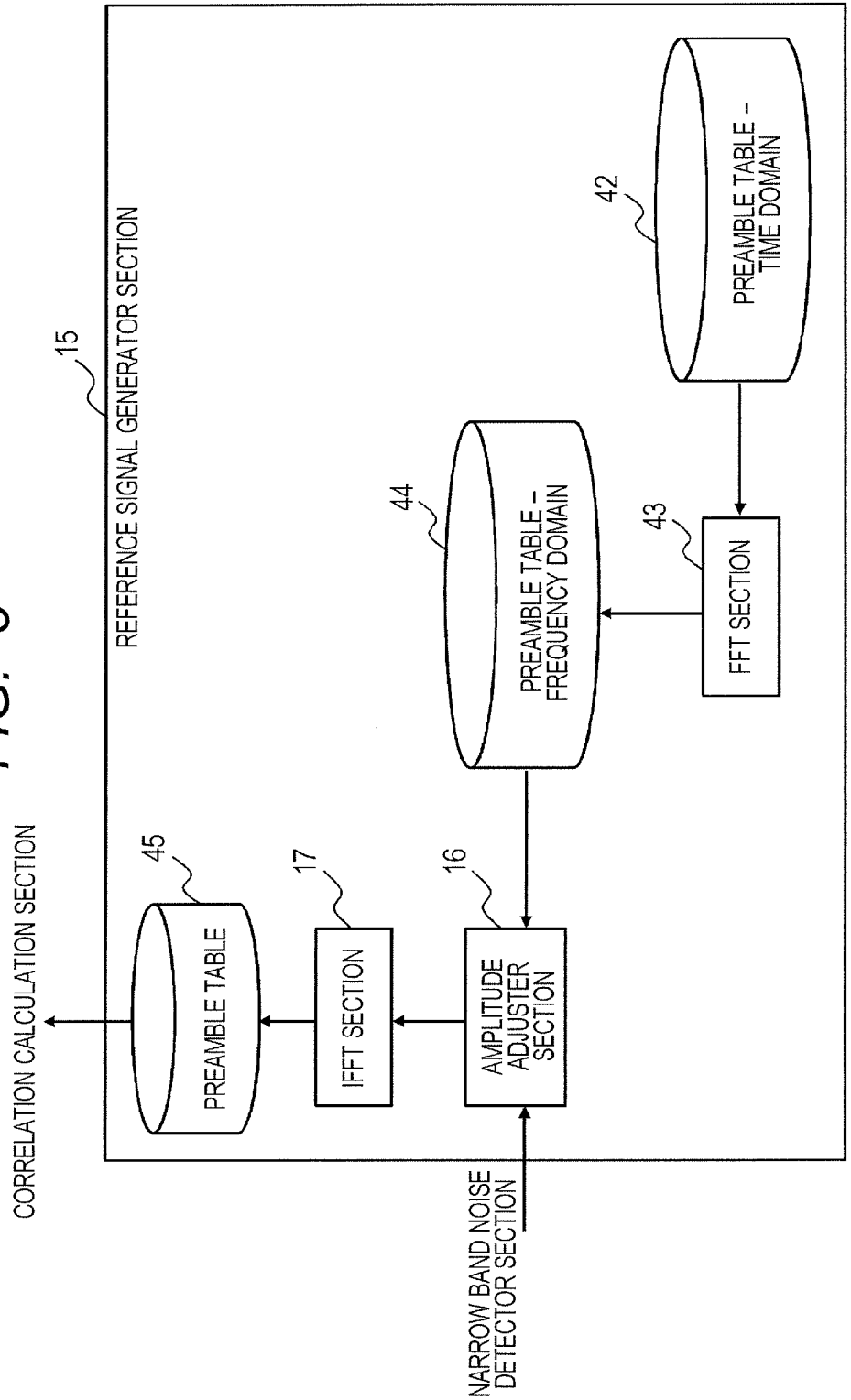
FIG. 5 is a block diagram of the reference signal generator section of the first embodiment.

A structural example of the reference signal generator section 15 of the first embodiment is described next in detail while referring to FIG. 5. The reference signal generator section 15 is described utilizing a preamble signal as an example of the reference signal. The preamble signal is a signal utilized in correlation calculation with the synchronization signal contained in the input signal, in order to perform frame synchronization processing, and this signal moreover has a pre-determined waveform.

The reference signal generator section 15 includes a time domain preamble table 42, a FFT section 43, a frequency domain preamble table 44, an amplitude adjuster section 16, an IFFT section 17, and a preamble table 45. The amplitude adjuster section 16 and the IFFT section 17 contain the same functions as the amplitude adjuster section 16 and IFFT section 17 in FIG. 1. Here, utilizing the preamble signal as an example of the reference signal is described while using the preamble table 45 as the reference signal table 18 in FIG. 1.

Preamble data utilized for generating the time domain preamble signal is recorded in the time domain preamble table 42. The FFT unit 43 converts the time domain preamble signal output from the time domain preamble table 42 into a frequency domain preamble signal. The FFT unit 43 outputs the frequency domain preamble signal to the frequency domain preamble table 44.

Information relating to the frequency domain preamble signal output from the FFT section 43 is recorded in the frequency domain preamble table 44.

The amplitude adjuster section 16 receives information relating to the subcarrier where the narrow band noise is occurring, that is output from the narrow band noise detector section 12. The amplitude adjuster section 16 sets the subcarrier where the narrow band noise is occurring to 0 amplitudes or to a sufficiently small value relative to the frequency domain preamble signal output from the frequency domain preamble table 44. The amplitude adjuster section 16 outputs an amplitude-adjusted preamble signal to the IFFT section 17.

The IFFT section 17 converts the frequency domain preamble signal received from the amplitude adjuster section 16 to a time domain preamble signal and outputs it to the preamble table 45. Information relating to the time domain preamble signal output from the IFFT section 17 is recorded in the preamble table 45. The preamble table 45 outputs the time domain preamble signal with the amplitude adjusted by the amplitude adjuster section 16, to the correlation calculation section 19.

Utilizing the receiver 1 of the first embodiment as described above allows detecting the narrow band noise contained in the signal input to the receiver 1. The narrow band noise detector section 12 is further capable of specifying the frequency where the narrow band noise is occurring. The reference signal generator section 15 can in this way reduce the amplitude value to 0 or to a sufficiently small value in the frequency where the narrow band noise is occurring. Consequently, the correlation between the reference signal and the narrow band noise can be prevented from occurring. Alternatively, the correlation between the reference signal and the narrow band noise can be limited to a small value.

Preventing a correlation between the reference signal and narrow band noise or limiting the correlation to a small value will prevent the correlation between the receive frame and reference signal from becoming embedded in the correlation between the narrow band noise and reference signal. The frame synchronization immunity to narrow band noise can therefore be improved.

Second Embodiment

Figure 6:
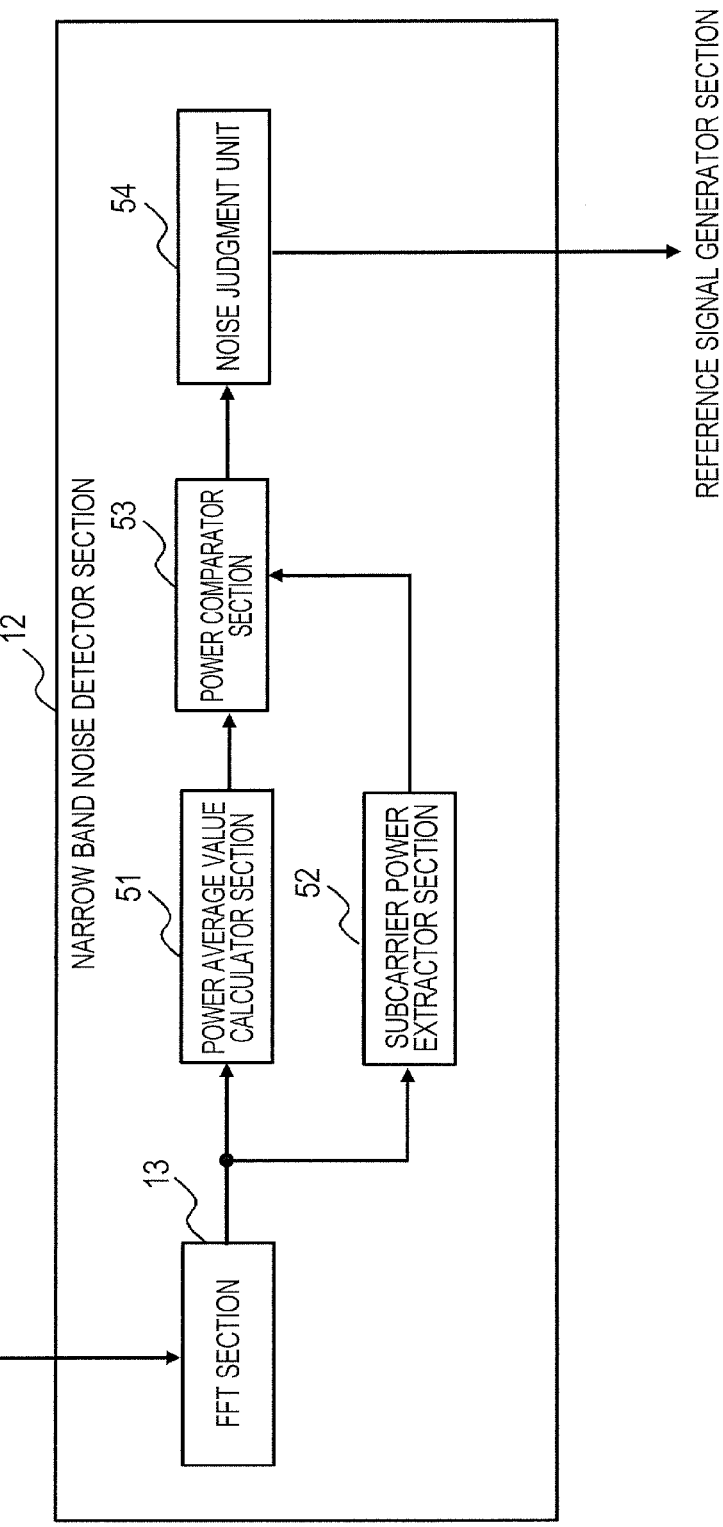
FIG. 6 is a block diagram of the narrow band noise detector section of a second embodiment.

A structural example of the narrow band noise detector section 12 of a second embodiment is described next in detail while referring to FIG. 6. The narrow band noise detector section 12 includes an FFT section 13, a power average value calculator section 51, a subcarrier power extractor section 52, a power comparator section 53, and a noise judgment unit 54.

The FFT section 13 converts the time domain digital signal output from the AFE 11 to a frequency domain digital signal. The FFT section 13 outputs the frequency domain digital signal to the power average value calculator section 51 and the subcarrier power extractor section 52.

The power average value calculator section 51 utilizes the frequency domain digital signal output from the FFT section 13 to calculate the average value of the total receive power of the frequency band being used. The power value corresponding to the frequency is described with the name receive power. Information relating to the frequency band being used is determined in advance and may be notified ahead of time to the power average value calculator section 51 and the subcarrier power extractor section 52. The power average value calculator section 51 notifies the power comparator section 53 of information relating to the average value of the total receive power of the frequency band being used.

The subcarrier power extractor section 52 utilizes the frequency domain digital signal output from the FFT section 13 to extract the power value of each subcarrier contained in the frequency band being used. The subcarrier power extractor section 52 outputs the power value of each subcarrier in sequence to the power comparator section 53. The subcarrier power extractor section 52 for example outputs the receive power values in sequence starting from subcarriers in the low frequency band to the power comparator section 53. Alternatively, the subcarrier power extractor section 52 may output the receive power values in sequence starting from subcarriers in the high frequency band to the power comparator section 53.

The power comparator section 53 compares the average value of the total receive power for the frequency band being used with the receive power value of each subcarrier. The power comparator section 53 outputs to the noise judgment unit 54, information relating to which among the average value of the total receive power output from the power average value calculator section 51, and the receive power output from the subcarrier power extractor section 52 is higher and to what extent. Moreover when the receive power of the subcarrier is higher, the power comparator section 53 outputs to the noise judgment unit 54 information relating to how much higher the subcarrier receive power is than the average value of the total receive power.

The noise judgment unit 54 decides whether or not narrow band noise has occurred based on information output from the power comparator section 53. When the subcarrier receive power is higher than the average value of the total receive power by a specified percentage or more then the noise judgment unit 54 decides that narrow band noise has occurred in that subcarrier. The noise judgment unit 54 may also decide that narrow band noise has occurred in that subcarrier when the subcarrier receive power is higher than the average value of the total receive power, and the difference between the average value of the total receive power and the subcarrier receive power is higher than a specified value. The noise judgment unit 54 outputs the subcarrier information that narrow band noise is occurring to the reference signal generator section 15.

Figure 7:
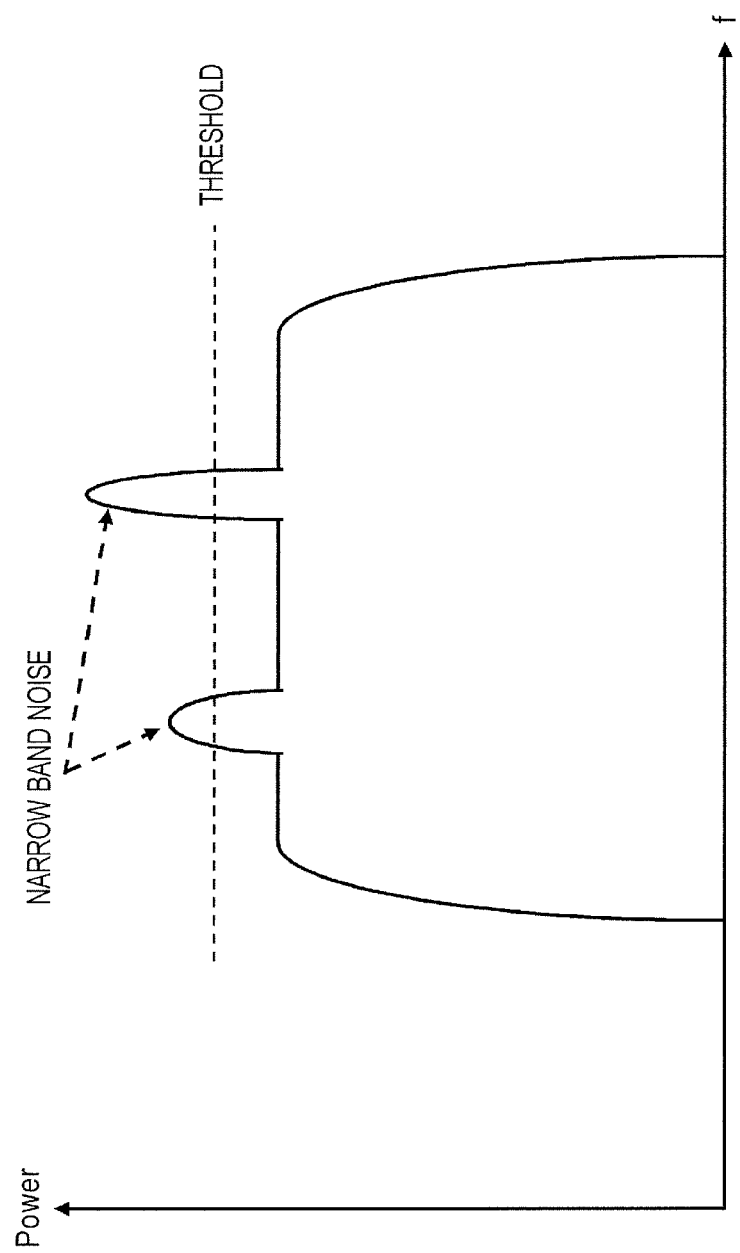
FIG. 7 is a drawing for describing the narrow band noise of the second embodiment.

The detection of narrow band noise by the narrow band noise detector section 12 is described next using FIG. 7. In FIG. 7 a power value larger than the average value of the total receive power by the specified value is set as a threshold value, and the locations where the power exceeds the threshold is regarded as narrow band noise.

Utilizing the narrow band noise detector section 12 of the second embodiment of the present invention as described above, allows detecting subcarriers where narrow band noise is occurring. Moreover, the method for detecting narrow band noise in the second embodiment renders the following effects compared to the method for detecting narrow band noise by comparing receive power values among adjacent subcarriers. These effects are described while referring to FIG. 8.

Figure 8:
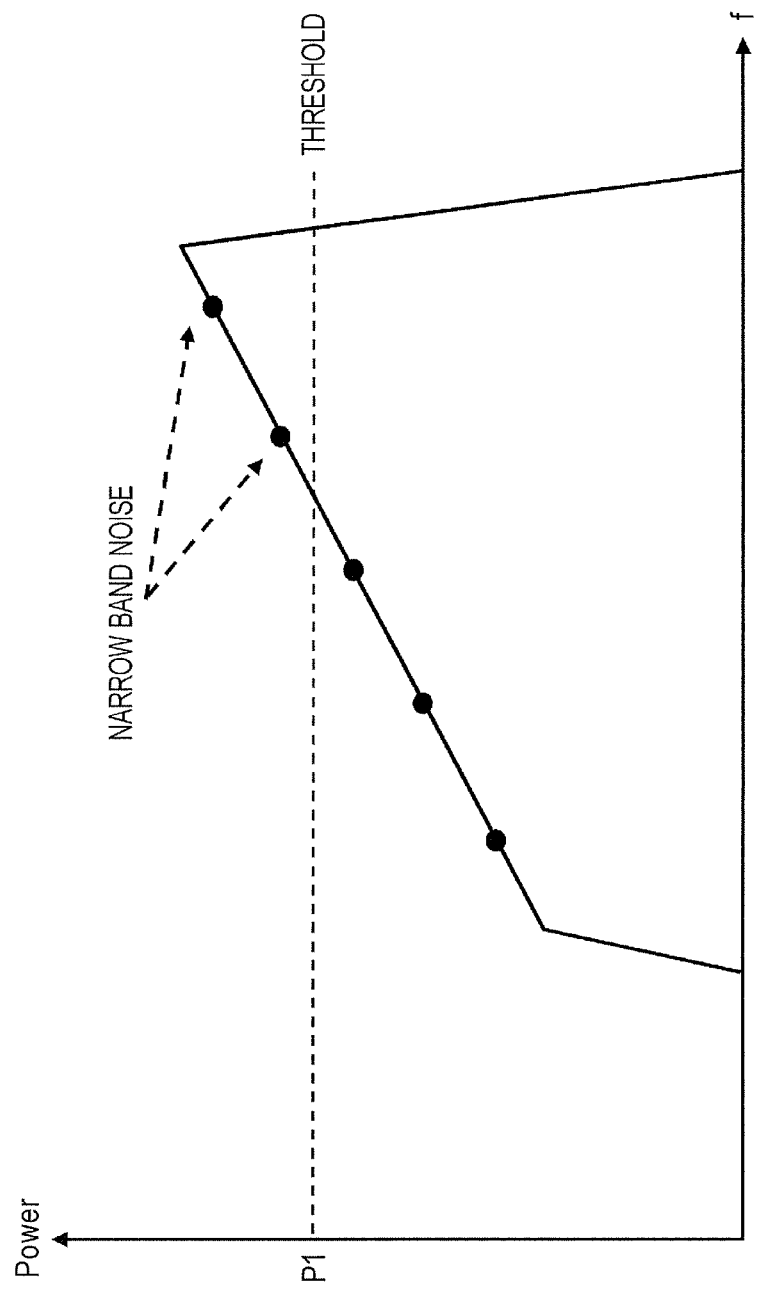
FIG. 8 is a drawing for describing the narrow band noise of the second embodiment.

FIG. 8 shows the state where the receive power value or the power increases as the frequency band becomes higher. When narrow band noise is detected after comparing the receive power value between adjacent subcarriers, but the difference in receive power values between adjacent subcarriers did not exceed a specified value, the judgment is made that narrow band noise is not occurring. However, the narrow band noise detection method of the second embodiment can judge that narrow band noise has occurred in that subcarrier when the receive power exceeds P1 which is set as a power larger than the average value of the total receive power by a specified value. The narrow band noise detection method of the second embodiment can in this way be utilized to detect narrow band noise that could not be detected by the method that detects narrow band noise by comparing the receive power between adjacent subcarriers. The narrow band noise detection method of the second embodiment can therefore improve the narrow band noise detection accuracy.

Third Embodiment

A structural example of the reference signal generator section 15 of a third embodiment is described next while referring to FIG. 9. The reference signal generator section 15 is described while utilizing a preamble signal as an example the same as the reference signal in FIG. 5. The reference signal generator section 15 in FIG. 9 includes a frequency domain preamble table 44, an amplitude adjuster section 16, an IFFT section 17, and a preamble table 45. The reference signal generator section 15 in FIG. 9, in other words, differs from the reference signal generator section 15 in FIG. 5 in the point of not containing a time domain preamble table 42 and a FFT section 43. The frequency domain preamble table 44, an amplitude adjuster section 16, an IFFT section 17, and a preamble table 45 in FIG. 9 are assigned the same reference numerals as the structural elements in FIG. 5 and have the same functions.

Figure 9:
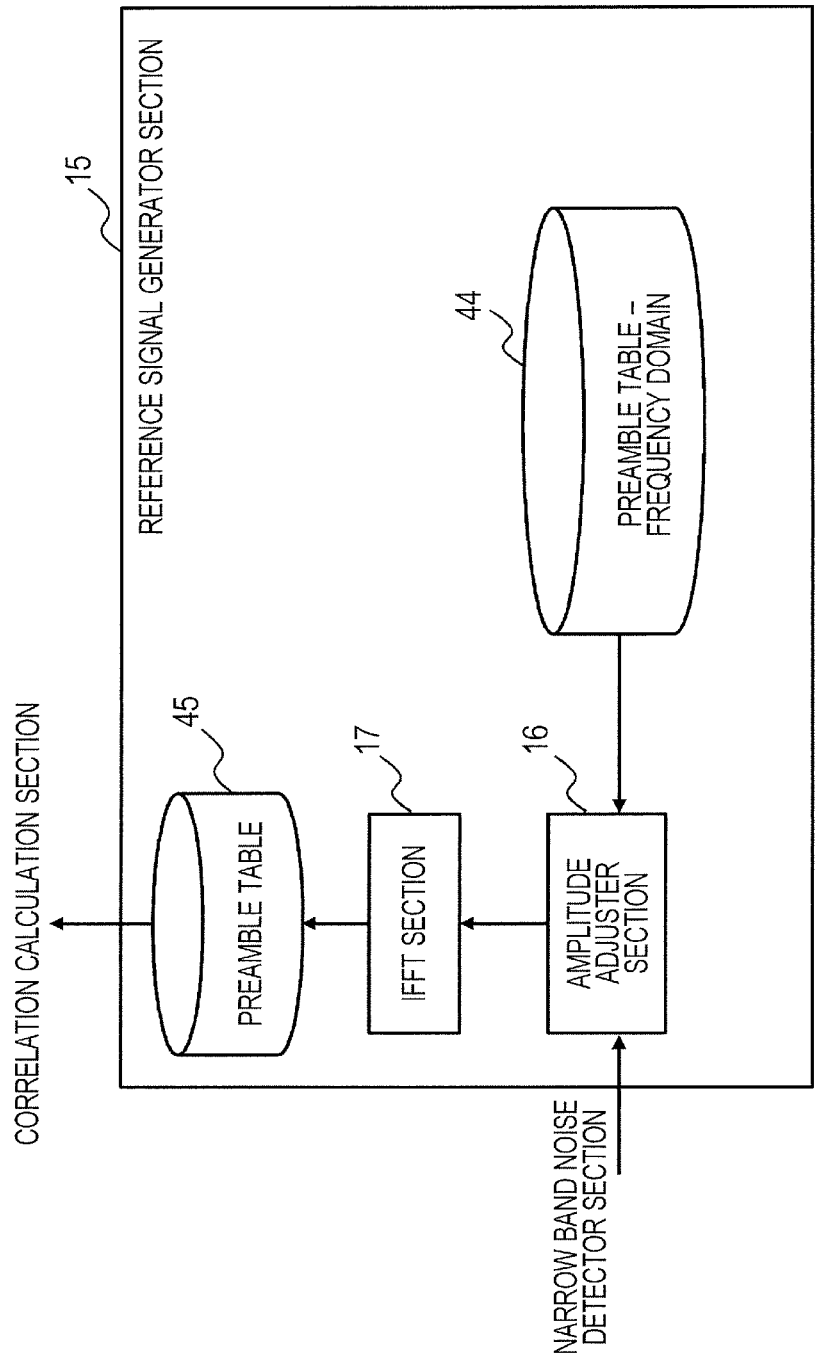
FIG. 9 is a block diagram of the reference signal generator section of a third embodiment.

Namely, by recording the preamble data in advance in the frequency domain preamble table 44 in order to generate a frequency domain preamble signal as shown in FIG. 9, reference signal generator section 15 can be configured without the time domain preamble table 42 and a FFT section 43. The reference signal generator section 15 can in this way have a more simplified structure.

Fourth Embodiment

A structural example of the receiver 100 of a fourth embodiment is described next while referring to FIG. 10. The receiver 100 in FIG. 10 differs from the receiver 1 in FIG. 1 in the point that the receiver 100 contains a timing control section 110. The timing control section 110 regulates the startup of the narrow band noise detector section 12 and the reference signal generator section 15. The timing control section 110 in other words implements periodic control so as to operate the narrow band noise detector section 12 and the reference signal generator section 15 at each specified timing (periods). The timing control unit 110 may as one example use a timer to operate the narrow band noise detector section 12 and the reference signal generator section 15 at each of the specified timings.

Narrow band noise is noise occurring at periodic intervals. There is generally little fluctuation in the frequency where narrow band noise occurs. There is therefore no need to operate the narrow band noise detector section 12 all the time. The reference signal generator section 15 also need not continually receive information relating to the frequency where the narrow band noise occurs from the narrow band noise detector section 12 and generate the reference signal. Setting a memory region for storing a reference signal setting value output from the reference signal generator section 15 into the correlation calculation section 19 for example allows stopping operation of the reference signal generator section 15. By periodically operating and stopping the narrow band noise detector section 12 and the reference signal generator section 15 in this way, the timing control section 110 can be utilized to conserve power and to reduce the processing load on the receiver 100.

A structure for intermittently (periodically) operating the narrow band noise detector section 12 and the reference signal generator section 15 by using a timing control section 110 is described for the fourth embodiment; however, the narrow band noise detector section 12 and the reference signal generator section 15 may also be intermittently operated based on control signals output for example from other circuits.

Specific examples of the invention rendered by the present inventors are described above; however, the present invention is not limited by these examples, and needless to say all manner of changes within a range not departing from the substance of the invention are allowable.

What is claimed is:

1. A receiver configured to receive an input signal through power lines, comprising:
   a narrow band noise detector configured to detect narrow band noise frequency in an input signal;
   a reference signal generator configured to generate a second reference signal whose amplitude value corresponding to the narrow band noise frequency of a first reference signal has been reduced, a correlation calculator configured to calculate a correlating value between the input signal and the second reference signal, and a demodulator configured to perform frame synchronization processing of the input signal using the correlating value and to generate a demodulating signal, wherein the reference signal generator comprises:

an amplitude adjuster configured to reduce amplitude value of the first reference signal corresponding to the narrow band noise frequency to generate a second frequency domain reference signal, and a converter configured to convert the second frequency domain reference signal to a second time domain reference signal, and configured to supply the correlation calculator with the second time domain reference signal as the second reference signal.

2. The receiver according to claim 1, wherein the converter is a first converter and the reference signal generator further comprises a second converter, wherein the second converter converts a first time domain reference signal to a first frequency domain reference signal and supplies the amplitude adjuster with the first frequency domain reference signal as the first reference signal.

3. The receiver according to claim 1, further comprising:

a timing controller configured to control the operating timing of the narrow band noise detector.

4. The receiver according to claim 1, wherein the input signal includes a synchronizing signal part and a data signal part, and wherein the reference signal is a preamble signal utilized for calculating the correlation with a synchronizing signal in the input signal.

5. A receiver which is used to receive an input signal through power lines, comprising:

a narrow band noise detector configured to detect narrow band noise frequency in an input signal;

a reference signal generator configured to generate a second reference signal whose amplitude value corresponding to the narrow band noise frequency of a first reference signal has been reduced, a correlation calculator configured to calculate a correlating value between the input signal and the second reference signal, and a demodulator configured to perform frame synchronization processing of the input signal using the correlating value and to generate a demodulating signal, wherein the narrow band noise detector comprises:

a converter to convert the input signal, which is a time domain signal, to a first signal in a frequency domain signal, and a narrow band noise frequency detector to detect the frequency where the narrow band noise is occurring in the first signal.

6. The receiver according to claim 5, wherein the narrow band noise detector is configured to compare the power values of adjacent subcarriers in the first signal, and to determine that the narrow band noise has occurred in subcarriers having a power value larger than a specified percentage.

7. The receiver according to claim 5, wherein the narrow band noise detector is configured to compare the average value of the total power of the subcarriers used in the first signal, and to determine that the narrow band noise has occurred in subcarriers having a power value larger than a specified percentage.

8. The receiver according to claim 5, wherein the converter is a first converter and the reference signal generator further comprises an amplitude adjuster and a second converter, wherein the amplitude adjuster is configured to reduce amplitude value of the first reference signal corresponding to the narrow band noise frequency to generate a second frequency domain reference signal, and wherein the second converter is configured to convert the second frequency domain reference signal to a second time domain reference signal, and configured to supply the correlation calculator with the second time domain reference signal as the second reference signal.

9. The receiver according to claim 8, wherein the reference signal generator further comprises a third converter, wherein the third converter is configured to convert a first time domain reference signal to a first frequency domain reference signal and to supply the amplitude adjuster with the first frequency domain reference signal as the first reference signal.

* * * * *